(12) United States Patent
Kawiecki et al.

(10) Patent No.: US 12,491,655 B1
(45) Date of Patent: Dec. 9, 2025

(54) BISTABLE SNAP-THROUGH BUCKLING WORK MATS

(71) Applicant: Flexeos, Inc., Fort Wayne, IN (US)

(72) Inventors: Matthew Kawiecki, Fort Wayne, IN (US); Corbin Blair, Fort Wayne, IN (US)

(73) Assignee: Flexeos, Inc., Fort Wayne, IN (US)

( * ) Notice: Subject to any disclaimer, the term of this patent is extended or adjusted under 35 U.S.C. 154(b) by 0 days.

(21) Appl. No.: 19/067,227

(22) Filed: Feb. 28, 2025

Related U.S. Application Data

(60) Provisional application No. 63/687,497, filed on Aug. 27, 2024.

(51) Int. Cl.
| | |
|---|---|
| *A47J 47/16* | (2006.01) |
| *A47J 47/00* | (2006.01) |
| *B26D 7/20* | (2006.01) |
| *A47J 43/24* | (2006.01) |

(52) U.S. Cl.
CPC .............. *B26D 7/20* (2013.01); *A47J 47/005* (2013.01); *A47J 43/24* (2013.01)

(58) Field of Classification Search
CPC ......... A47G 21/08; B26B 11/006; B60P 3/36; A47J 43/24; A47J 43/22; B29C 45/1676; F16J 15/52; B26D 7/20
USPC .................. 30/315; 24/662, 108, 324, 116 R
See application file for complete search history.

(56) References Cited

U.S. PATENT DOCUMENTS

| | | | | |
|---|---|---|---|---|
| 1,704,690 | A | * | 3/1929 | Bircher .................... B26B 3/00 269/289 R |
| D339,722 | S | * | 9/1993 | Ancona .......................... D7/505 |
| 9,992,971 | B2 | * | 6/2018 | McKinnon ........... A01K 5/0128 |
| D1,020,409 | S | * | 4/2024 | Kawiecki ................ A47J 43/24 D7/698 |
| 2008/0149552 | A1 | * | 6/2008 | Murphy ................ A47J 47/005 210/251 |
| 2016/0025129 | A1 | * | 1/2016 | Parker ..................... F16C 11/06 29/516 |
| 2020/0229651 | A1 | * | 7/2020 | Hoye ...................... A47J 43/24 |

FOREIGN PATENT DOCUMENTS

| | | | | |
|---|---|---|---|---|
| CA | 2846814 | A1 * | 9/2014 | ............... B25H 3/06 |
| CN | 211093598 | U * | 7/2020 | |
| EP | 1531130 | A1 * | 5/2005 | ......... B65D 47/2031 |

OTHER PUBLICATIONS

Convertible Coiander; Patent No. 2008105008; Document ID: WO 2008105008 A1; Date Published: Sep. 4, 2008; Inventor: Tosini Giorgio, Nani Roberto; Application No. IT 2007000150 W; Date Filed: Mar. 1, 2007 (Year: 2008).*
Totchop.com (Year: 2025).*

* cited by examiner

*Primary Examiner* — Mahdi H Nejad
(74) *Attorney, Agent, or Firm* — IPkey PLLC

(57) ABSTRACT

Bistable snap-through buckling work mats include a snap-through buckling mechanism, featuring a central work region and a perimetrical ring surrounding the central work region. The perimetrical ring exerts a radially-inward force on the central work region via a web. The snap-through buckling mechanism is designed to snap buckle between a stable first configuration, where the central work surface has a concave shape, and a stable second configuration, where the central work surface has a convex shape.

20 Claims, 7 Drawing Sheets

BISTABLE SNAP-THROUGH BUCKLING WORK MATS

CROSS-REFERENCE TO RELATED APPLICATIONS

This application claims the benefit of U.S. Provisional Application No. 63/687,497, filed on Aug. 27, 2024, the entirety of which is hereby incorporated by reference.

TECHNICAL FIELD

The present disclosure relates to work mats used in food, beverage, healthcare, and other applications.

BACKGROUND

Traditionally, work mats such as cutting mats designed for food preparation, both in the home and in commercial-scale food preparation, were made from wood, glass, metal, or ceramic materials according to a variety of construction techniques. More and more frequently, work mats and cutting boards manufactured for consumer use are made from plastic materials, e.g., HDPE (high-density polyethylene), polypropylene, etc., that are known to degrade and release or shed small plastic particles, known as microplastics, during use. Microplastics are tiny plastic particles that result from the degradation of larger plastic items. Commonly found in the environment, they pose a risk to human health and ecosystems. Scientific research is ongoing to assess the impact of these materials. In particular, frequent cutting and chopping on cutting surface of a plastic cutting board creates surface imperfections such as grooves, nicks, cuts, lacerations, and knife marks in the cutting surface, which can release microplastics into the food or article being prepared and into the general environment. These microplastics are subsequently ingested when the food is eaten. As currently understood, potential health impacts from the ingestion of microplastics include inflammation, toxicity, and disruption of the endocrine system. Microplastics can accumulate in the body over time, posing long-term health risks. These surface imperfections can also harbor bacteria and other contaminants, and are difficult to thoroughly clean and sanitize.

Work mats and cutting boards made from softer materials which do not as readily shed or release microplastics are being more widely adopted. However, such work mats are typically comprised of a piece of the material cut to a suitable size without any structure helping the work mat to maintain its shape during use or cleaning. Such work mats have similar drawbacks as the work mats and cutting boards described above in that contaminants such as food particles and liquids tend to become trapped in the surface imperfections (e.g., knife marks) formed during use, which complicates cleaning and sanitization after use.

Work mats and boards have also been used to support medical procedures, patient care, and pharmaceutical preparation in healthcare settings. Such work mats and boards have suffered from similar drawbacks as the work mats and cutting boards described above for use in food and beverage applications. In particular, such work mats and boards can harbor contaminants and be difficult to thoroughly sanitize, especially when cut through or into by a tool. Cutting boards and plates made from metal or plastic can cause premature and uneven wear on a cutting blade or tool being used to cut or manipulate an object on the plate and can introduce metal or plastic shavings into the object.

BRIEF SUMMARY

The present disclosure provides bistable snap-through buckling work mats engineered with a mechanism that enables snap-through buckling between a stable convex configuration and a stable concave configuration (i.e., "bistable"). A work surface of the work mat may be utilized in the concave shape, e.g., for cutting, and then snapped into the convex shape for cleaning any surface imperfections in the work surface. Advantageously, this enables hygienic use in applications where cleanliness is paramount, e.g., food, beverage, and healthcare applications.

BRIEF DESCRIPTION OF THE DRAWINGS

For a more complete understanding of the present disclosure, reference is now made to the following descriptions taken in conjunction with the accompanying figures, in which.

DETAILED DESCRIPTION

The present disclosure provides work mats engineered with a mechanism configured to cause controlled "snap-through buckling" between a stable convex configuration and a stable concave configuration (i.e., "bistable"). Accordingly, the work mats are "bistable snap-through buckling work mats," referred to herein as "work mats" for brevity. A work surface of the work mat may be utilized in the concave shape, e.g., for cutting, and then snapped into the convex shape to facilitate cleaning surface imperfections in the work surface. Advantageously, this enables repeated hygienic use in applications where cleanliness is paramount, e.g., food, beverage, and healthcare applications.

Figure 1:
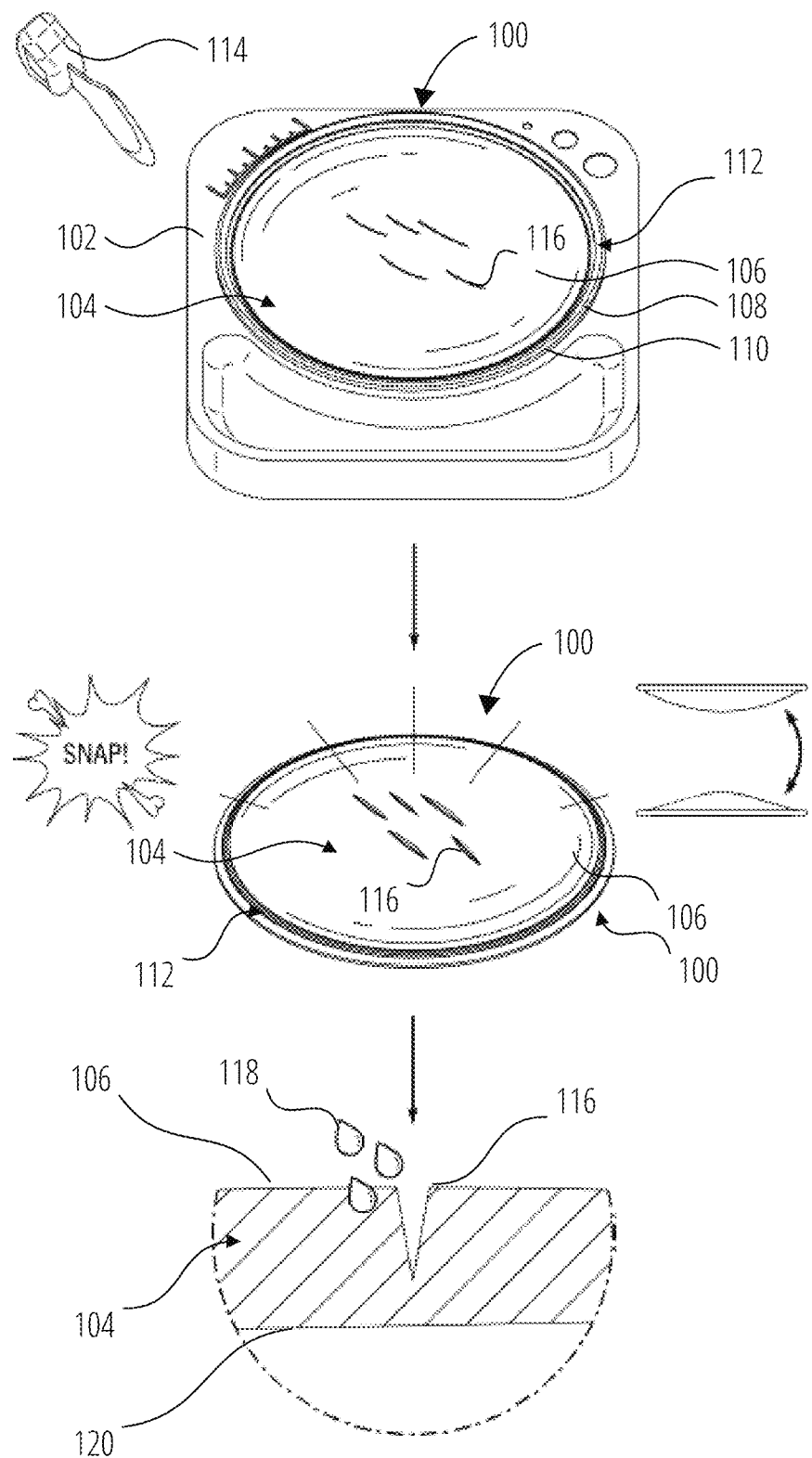
FIG. 1 schematically illustrates the structure and operation of a bistable snap-through buckling work mat of the present disclosure.

FIG. 1 schematically illustrates a chronological sequence of the structure and operation of a work mat 100 of the present disclosure, moving from top to bottom. Referring first to the top graphic, FIG. 1 illustrates a cutting board 102 having a concave cutting surface with a work mat 100 disposed thereon. The cutting board 102 shown in FIG. 1 is representative and may have numerous alternative shapes and sizes. While the top image of FIG. 1 shows the work mat 100 disposed upon the optional cutting board 102, it shall be understood that the work mat 100 may be sold and used independently from the cutting board 102. Any of the work mats 100 provided herein may also be provided with at least the cutting board 102 as a kit.

The bistable snap-through buckling work mat 100 is made at least partially of a flexible, elastomeric material and includes a central work region 104 with a central work surface 106, surrounded by a perimetrical ring 108, and connected by a web 110 extending therebetween. A snap-through buckling mechanism 112 comprises at least a portion of the central work region 104, at least a portion of the perimetrical ring 108, and at least a portion of the web 110. The snap-through buckling mechanism 112 enables the central work surface 106 to "snap" or "pop" between two stable states-concave and convex configurations-through the engineered release of stored energy in the central work region 104, perimetrical ring 108, and/or web 110.

In the top graphic of FIG. 1, the central work region 104 is in the concave configuration, i.e., the configuration in which the central work surface 106 has a concave shape. In the concave configuration, work mat 100 may be utilized in connection with one or more instruments such as a cutting tool 114, e.g., to prepare food, tissue, medication, medical supplies, etc. During use, the central work surface 106 will accumulate surface imperfections such as nicks and cuts 116.

After use in the concave configuration, the work mat 100 may be "snapped" by a user into the convex configuration for cleaning and preparation for the next use. The middle graphic of FIG. 1 shows the work mat 100 "snapping" into the convex configuration in which the central work surface 106 has a convex shape. To transition from the concave configuration to the convex configuration, a user applies a force to a reverse surface 120 of the central work region 104 (opposite the central work surface 106), urging the central work region 104 to reverse convexity, causing the central work region 104 to elastically deform toward and through the perimetrical ring 108 until the urging force overcomes a radially-inward stabilizing force imparted thereon by the hoop stress from the perimetrical ring 108 via the web 110. When the central work region 104 is in the concave configuration, this radially-inward stabilizing force biases the central work region 104 to the concave configuration (the reverse is true when the central work region 104 is in the convex configuration).

When the urging force overcomes the stabilizing force imparted on the central work region 104 by the hoop stress from the perimetrical ring 108 and web 110, the central work region 104 buckles, releasing stored energy in the polymeric material, causing the central work region 104 to "snap" through the perimetrical ring 108 and reverse convexity, at which time the same radially-inward force imparted by the perimetrical ring 108 stabilizes the central work surface 106 in the convex configuration-substantially opposite of the concave configuration. In some embodiments, the work mat 100 creates an audible response (such as a snapping or popping sound) when snapping between the concave and convex configurations. However, this is optional. As used herein, to "snap" means "to buckle" or otherwise rapidly transition (e.g., in a binary manner) from one stable configuration to another stable configuration, e.g., under its own force.

Thus, unlike known work mats, cutting boards, housewares, and the like that simply bend or deform under pressure, the work mats 100 described herein feature an engineered snap-through buckling mechanism that creates true bistable behavior through the controlled release of stored energy. As detailed below, such functionality is enabled by the hoop stress of the perimetrical ring 108 imparting a radially-inward force on the central work surface 106 via the web 110. Additional features, including material selection, geometry, dimension, and optional structural features such as a stiffening insert further contribute to the snap-through buckling and bistable properties.

As shown in the bottom graphic of FIG. 1, the convex shape of the central work surface 106 in the convex configuration advantageously facilitates cleaning of the surface imperfections (e.g., with a cleaning fluid 118) by opening the nicks and cuts 116. The mat is engineered for repetitive functional use, allowing users to intentionally change its shape between the two stable states without material fatigue, even after the central work surface 106 accumulates extensive surface imperfections.

FIG. 2A-FIG. 2F show various aspects of the work mat 100 in the stable concave configuration, e.g., after snap-through buckling from the convex configuration shown in FIG. 3A-FIG. 3D. In the concave configuration, the work mat 100 may be placed upon an optional cutting board or used upon any surface. The work mat 100 generally includes the perimetrical ring 108 surrounding the central work region 104, wherein the perimetrical ring 108 experiences a hoop stress that exerts a radially-inward force on the central work region 104 via the web 110 extending between the central work region 104 and the perimetrical ring 108.

Figure 2A:
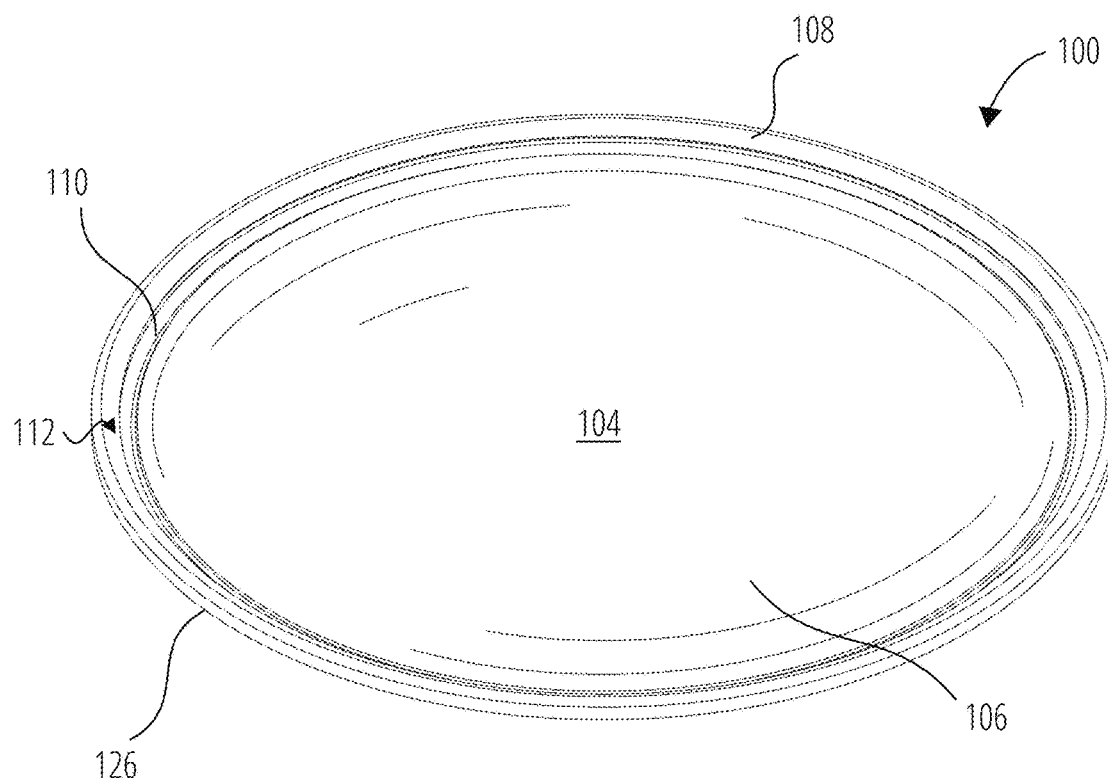
FIG. 2A illustrates a perspective view of a bistable snap-through buckling work mat of the present disclosure in a concave configuration.
Figure 2B:
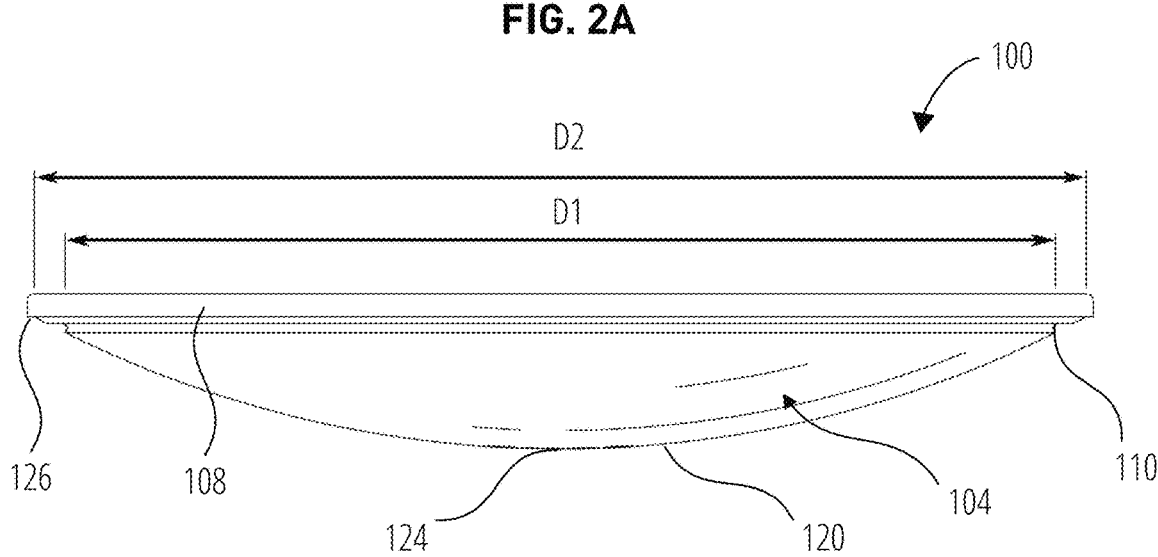
FIG. 2B illustrates a side elevation view thereof.

Referring to FIG. 2A-FIG. 2B, the work mat 100 may be molded at least in part of a flexible, elastomeric material which is Food and Drug Administration-compliant for food applications, such as polysiloxane (silicone), fluorosilicone, Thermoplastic Elastomers (TPEs), Thermoplastic Polyurethane (TPU), and Styrene-Ethylene-Butylene-Styrene (SEBS).

Depending on the formulation of the flexible, elastomeric material, the dimensions described below may be modulated to achieve sufficient snap-through buckling between the concave and convex configurations. For example, any of the embodiments described herein may be integrally molded or otherwise formed of a silicone having a 35 shore A durometer.

The central work region 104 defines a central work surface 106 on one side and a reverse surface 120 on the opposite side. Both the central work surface 106 and the reverse surface 120 may be utilized as work surfaces that accumulate surface imperfections during use, and the snap-through buckling mechanism of the work mat 100 facilitates cleaning of nicks and cuts 116 on both sides. While the figures show a smooth central work surface 106, the surface may alternatively include features such as partitions, recesses, or other surface characteristics that facilitate use, while maintaining the mat's fundamental bistable property.

The central work region 104 can be configured in different shapes while maintaining its ability to transition between the two stable states: a first configuration (concave configuration) wherein the central work surface 106 has a concave shape and a second configuration (convex configuration) where the central work surface 106 has a convex shape. The shape of the central work region may be round, ovular, or other geometries that permit snap-through buckling mechanism.

Figure 2C:
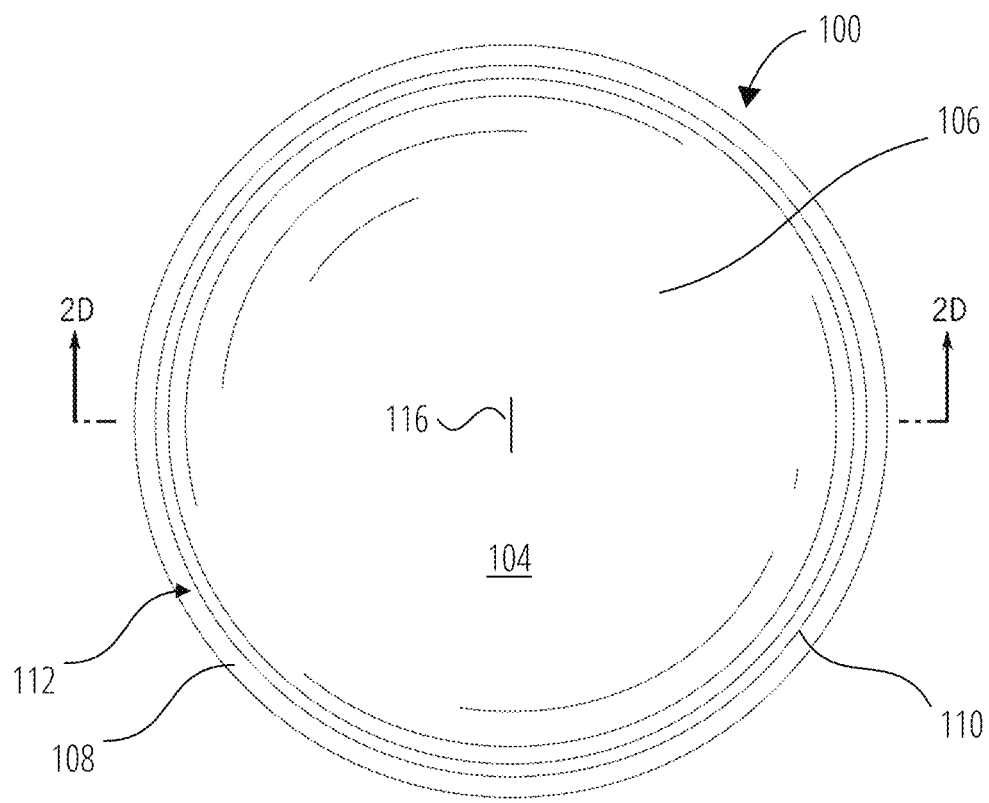
FIG. 2C illustrates a top plan view thereof.
Figure 2D:
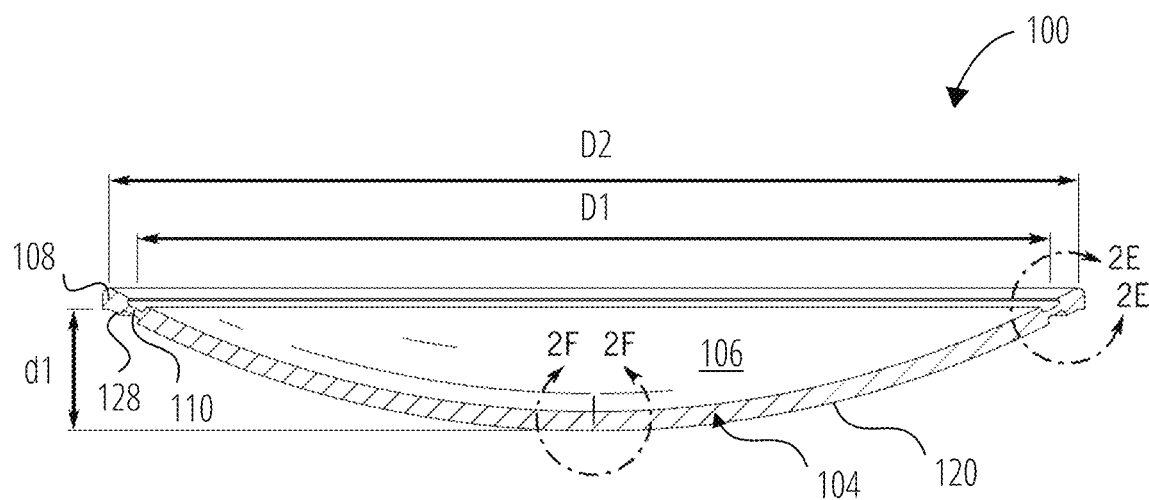
FIG. 2D illustrates a side section view thereof.

The central work region 104 has a first diameter D1, a first thickness 122 (see FIG. 2E), and a first depth d1 (i.e., the z-axis depth in the concave configuration from a plane extending across a top edge of the central work region 104 to a nadir 124 of the central work surface 106) (see FIG. 2D).

The perimetrical ring 108 surrounds the central work region 104 and can be integrally molded with the central work region from the flexible, elastomeric material. The perimetrical ring 108 experiences tensile hoop stress and exerts a radially-inward force on the central work region 104, which enables the snap-through buckling effect and the bistable property of the work mat 100. The perimetrical ring 108 also contributes to the overall structural integrity of the work mat 100, helping maintain its shape and functionality during use.

Some embodiments of the perimetrical ring 108 include an optional annular bead 126 extending away from one or both sides thereof. The annular bead 126 may function as a key or alignment feature that facilitates secure placement on a compatible cutting board or other surface. The perimetrical ring 108 connects to the central work region 104 via a web 110. The ring's structure can be stiffened in some embodiments through the inclusion of a stiffening insert disposed within a circumferential channel in the ring. This stiffening insert can increase the hoop stress of the perimetrical ring 108 and the radially-inward force applied to the central work region 104. All else equal, the greater the hoop stress, the greater the threshold urging force is necessary to snap the snap-through buckling mechanism 112 between the concave and convex configurations.

The perimetrical ring 108 has a second diameter D2 and a second thickness 130 (see FIG. 2E) that may be the same as or different from the first thickness 122 of the central work region 104. When integrally molded with the central work region 104, the perimetrical ring 108 can be formed from the same material, though the structure allows for potential variation in material properties between the ring and central region to optimize the bistable functionality of the work mat 100, e.g., through overmolding or comolding.

The web 110 extends between the perimetrical ring 108 and the central work region 104, serving to transfer the radially-inward force from the perimetrical ring 108 to the central work region 104. The web 110 has a third thickness 132 (see FIG. 2E) that is generally less than the first thickness 122 of the central work region 104 and less than the second thickness 130 of the perimetrical ring 108. This reduced thickness allows the web 110 to accommodate the expansion and movement of the central work region 104 as it snaps through the perimetrical ring 108 between the concave and convex configurations.

The web 110 can be integrally molded with both the central work region 104 and the perimetrical ring 108 from the flexible, elastomeric material. The geometry and material properties of the web 110 influence the force required for snapping between the stable states, as the web 110 helps control how the stored elastic energy is distributed during the snap-through buckling process. The web's design allows it to flex and deform while maintaining the structural connection between the ring and central region.

Each of the stable convex configuration and concave configuration can be objectively identified. For example, in a stable first configuration (convex or concave), the central work surface 106 and the web 110 extend away from a first side of the perimetrical ring 108, whereas in the stable second configuration (concave or convex), the central work surface 106 and the web 110 extend away from a second side of the perimetrical ring 108, opposite the first side. Compare FIG. 2D with FIG. 3C. As another example, the perimetrical ring 108 partially inverts (turns inside out) about its radial axis when snapping between the stable first configuration and the stable second configuration. Accordingly, in a stable first configuration (convex or concave), a radial-inward edge 128 of the perimetrical ring 108 points toward a first side of the perimetrical ring 108, whereas in the stable second configuration, the same radial-inward edge 128 of the perimetrical ring 108 points toward the second side of the perimetrical ring 108, opposite the first side. Again, compare FIG. 2D with FIG. 3C. As another example, in the stable concave configuration, the web 110 biases the central work surface 106 toward the concave shape (see FIG. 2A-FIG. 2D), wherein the stable convex configuration, the web 110 biases the central work surface 106 toward the convex shape (see FIG. 3A-FIG. 3D). As yet another example, the stable convex and concave configurations may be identified in some embodiments because the snap-through buckling mechanism is unstable in all intermediate configurations between the stable convex and concave configurations (i.e., snapping between the two stable configurations is binary). Restated, as the central work region 104 is deformed with a force urging it to reverse convexity, it remains biased toward its most recent stable state, and will rebound to its most recent stable state, unless and until at least a threshold urging force is applied to the central work region 104 that causes the controlled release of energy stored in the central work region 104, perimetrical ring 108, and web 110 and triggering the snap-through buckling action.

Figure 2E:
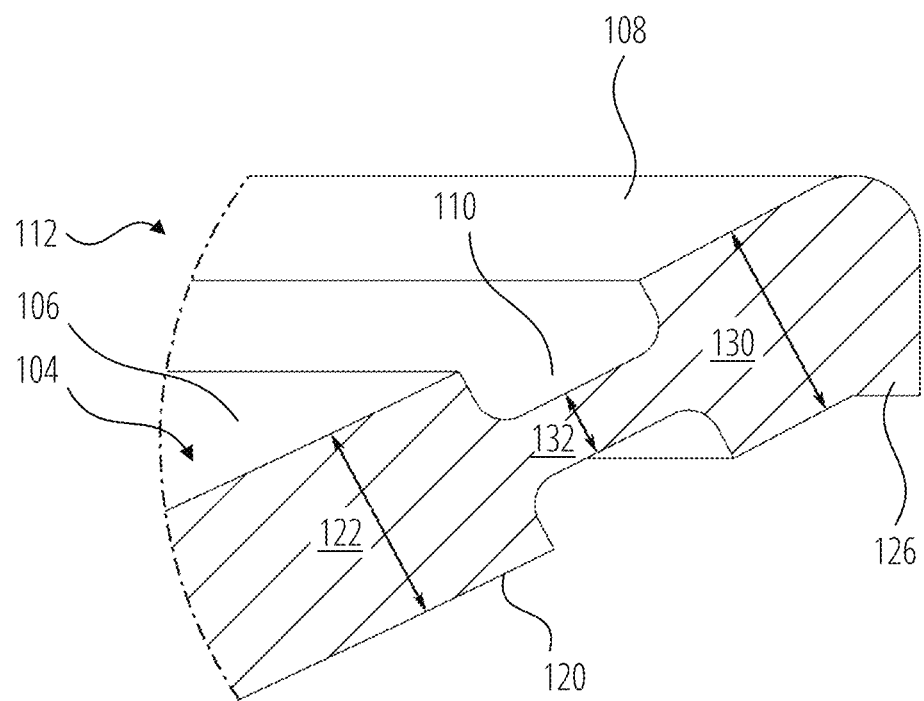
FIG. 2E illustrates a detail view of aspects of a snap-through buckling mechanism of the work mat of FIG. 2A.
Figure 2F:
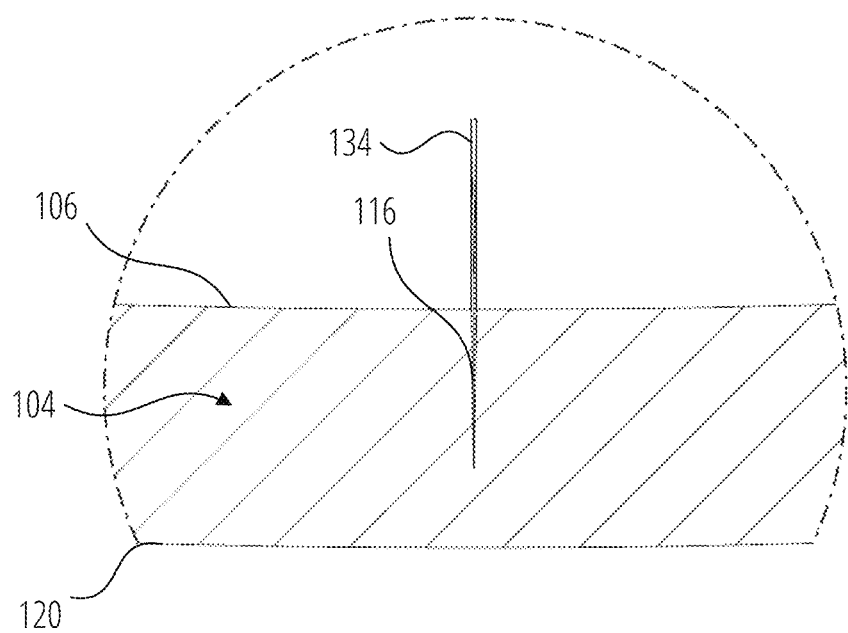
FIG. 2F illustrates a detail view of additional aspects of the work mat of FIG. 2A.

FIG. 2C-FIG. 2D respectively show a top plan view and side section view of the work mat 100 in order to illustrate details thereof in relation to the snap-through buckling mechanism 112, central work surface 106, perimetrical ring 108, and web 110, which are further described in the detail views of FIG. 2E and FIG. 2F. During regular use, the central work region 104 may accumulate surface imperfections on the central work surface 106 and the reverse surface 120, such as a lacerations and nicks and cuts 116. The snap-through buckling mechanism 112 facilitates cleaning of those nicks and cuts 116. The central work region 104 has a first diameter D1 and a first depth d1, and the perimetrical ring 108 has a greater second diameter D2. The web 110 connects the central work region 104 to the perimetrical ring 108.

Representative dimensions will now be described which are applicable to embodiments of the work mat 100 molded from 35 Shore A silicone and also applicable to embodiments formed of different flexible, elastomeric materials.

The first diameter D1 of the central work region 104 may be about 100 mm to about 200 mm, e.g., about 130 mm to about 150 mm. The first depth d1 may be about 10 mm to about 20 mm, e.g., about 15 mm to about 17 mm. A ratio of the first diameter D1 to the first depth d1 may be about to about 5 to about 20, e.g., about 5 to about 10 or about 7 to about 9. The second diameter D2 of the perimetrical ring 108 may be about 110 mm to about 220 mm, e.g., about 140 mm to about 160 mm.

FIG. 2D illustrates objective markers of the stable concave configuration, in addition to the concave shape of the central work surface 106. For example, the central work surface 106 and the web 110 extend away from a (bottom) first side of the perimetrical ring 108, whereas in the stable concave configuration (see FIG. 3C), the central work surface 106 and the web 110 extend away from a second side of the perimetrical ring 108, opposite the first side. Similarly, FIG. 2D shows a radial-inward edge 128 of the perimetrical ring 108 pointing toward the same first side of the perimetrical ring 108 as the web 110 and central work surface 106 extend. In the stable convex configuration (see FIG. 3C), the radial-inward edge 128 of the perimetrical ring 108 points toward the opposite second side of the perimetrical ring 108. As shown in FIG. 2D, in the stable concave configuration, the web 110 biases the central work surface 106 toward the concave shape, whereas in the stable convex configuration shown in FIG. 3C, the web 110 biases the central work surface 106 toward the convex shape.

FIG. 2E shows a detail view of the section view of FIG. 2D, illustrating aspects of the snap-through buckling mechanism 112. The central work region 104 has the first thickness 122, the perimetrical ring 108 has the second thickness 130, and the web 110 has the third thickness 132.

The first thickness 122 characterizes a thickness of the central work region 104 at a location radially proximate to the web 110. The first thickness 122 is generally proportional to the mass of the central work region 104, all else equal. Accordingly, the greater the first thickness 122, the greater amount of stored energy is needed to achieve snap-through buckling of the central work region 104. In some embodiments, first thickness 122 is uniform throughout the central work region 104; however, in other embodiments, the thickness of the central work region 104 varies radially and/or circumferentially. The first thickness 122 may range from about 2.0 mm, 3.0 mm, or 4.0 mm to about 5.0 mm; from about 2.0 mm to about 3.0 mm, 4.0 mm, or 5.0 mm; or from about 3.00 mm to about 4.00 mm.

The second thickness 130 characterizes a thickness of the perimetrical ring 108 at a location radially proximate to the web 110 (opposite the central work region 104). The second thickness 130 is generally proportional to the rigidity of the annular bead 126, as well as the hoop stress exerted by the perimetrical ring 108 on the central work region 104. Accordingly, the greater the second thickness 130, the greater the radially-inward force exerted by the perimetrical ring 108 on the central work region 104, all else equal. As shown, the thickness of the perimetrical ring 108 may vary at different radial locations, e.g., as a result of the optional annular bead 126. In some embodiments, the second thickness 130 is radially uniform across the perimetrical ring 108. The second thickness 130 may range from about 2.0 mm, 3.0 mm, 4.0 mm, or 5.0 mm to about 7.0 mm; from about 2.0 mm to about 3.0 mm, 4.0 mm, 5.0 mm, 6.0 mm, or 7.0 mm; or from about 4.00 mm to about 6.00 mm.

The third thickness 132 characterizes the web 110 extending from the central work region 104 to the perimetrical ring 108. The third thickness 132 is generally proportional to the overall stiffness of the snap-through buckling mechanism 112, i.e., the ability of the web 110 to transfer force between the perimetrical ring 108 and the central work region 104. Accordingly, the greater the third thickness 132—both in absolute terms and relative to the first thickness 122 and second thickness 130, the greater force must be applied by the user to the central work region 104 to achieve the snap-through buckling effect. In some embodiments, the third thickness 132 is radially uniform across the web 110. The third thickness 132 may range from about 0.5 mm, 0.75 mm, 1.0 mm, or 1.25 mm to about 1.50 mm; from about 0.5 mm to about 0.75 mm, 1.0 mm, or 1.25 mm to about 1.50 mm; or from about 0.75 mm to about 1.25 mm.

As will be readily understood, there are countless different combinations of different dimensions and materials. The inventors have discovered after rigorous testing and experimentation that relationships between the first thickness 122, the second thickness 130, and the third thickness 132 influence the efficacy of the snap-through buckling mechanism 112. For example, in some embodiments, a ratio of the first thickness 122 (of the central work region 104) to the third thickness 132 (of the web 110) is about 2.0 to about 10.0, e.g., about 3.0 to about 5.0 or about 3.5 to about 4.5. Similarly, the ratio of the second thickness 130 (of the perimetrical ring 108) to the third thickness 132 (of the web 110) is about 3.0 to about 13.0, e.g., about 3.0 to about 8.0, about 3.5 to about 4.5, or about 4.0 to about 6.0. Further still, the ratio of the second thickness 130 (of the perimetrical ring 108) to the first thickness 122 (of the central work region 104) is about 1.0 to about 2.5, e.g., about 1.0 to about 1.5.

Embodiments of the work mat 100 (specifically including those formed at least partially of silicone) may feature any combination of the foregoing dimensional characteristics. Table 1 and Table 2 below provide representative dimensional combinations of snap-through buckling mechanisms 112 and work mats 100 integrally molded from 35 Shore A silicone and which exhibit snap-through buckling. The following dimensions and dimensional relationships were discovered by the inventors after rigorous experimentation with numerous dimensional combinations.

TABLE 1

Representative Dimensional Combinations

| Embodiment | First Thickness (Central Work Region 102) (mm) | Second Thickness (Perimetrical Ring 106) (mm) | Third Thickness (Web 100) (mm) | First Diameter (Central Work Region 102) (mm) | Second Diameter (Perimetrical Ring 106) (mm) | Depth (Central Work Region 102) (mm) |
|---|---|---|---|---|---|---|
| A | 2.75-3.25 | 3.75-4.25 | 1.00-1.50 | 137.5-142.5 | 150.0-155.0 | 15.0-17.0 |
| B | 3.75-4.25 | 3.75-4.25 | 1.00-1.50 | 137.5-142.5 | 150.0-155.0 | 15.0-17.0 |
| C | 3.75-4.25 | 3.75-4.25 | 0.75-1.25 | 137.5-142.5 | 150.0-155.0 | 15.0-17.0 |
| D | 3.75-4.25 | 5.75-6.25 | 0.75-1.25 | 137.5-142.5 | 150.0-155.0 | 15.0-17.0 |

TABLE 2

Representative Dimensional Ratio Combinations

| Embodiment | First Thickness:Third Thickness Ratio | Second Thickness:Third Thickness Ratio | Second Thickness:First Thickness Ratio | First Diameter:First Thickness Ratio | First Diameter:Depth Ratio | Second Diameter:First Diameter Ratio |
|---|---|---|---|---|---|---|
| A | 2.0-2.5 | 3.0-3.5 | 1.0-1.5 | 43.0-48.0 | 8.0-9.0 | 1.0-1.5 |
| B | 3.0-3.5 | 3.0-3.5 | 0.8-1.3 | 33.0-38.0 | 8.0-9.0 | 1.0-1.5 |
| C | 3.8-4.3 | 3.8-4.3 | 0.8-1.3 | 33.0-38.0 | 8.0-9.0 | 1.0-1.5 |
| D | 3.8-4.3 | 5.8-6.3 | 1.3-1.8 | 33.0-38.0 | 8.0-9.0 | 1.0-1.5 |

As shown, the perimetrical ring 108 has an optional radial annular bead 126 extending away from a reverse side thereof. The annular bead 126 is a type of key that facilitates aligned interfacing with complementary features of a cutting board (such as a circumferential channel of the cutting board 102 shown in FIG. 1). In some embodiments, the annular bead 126 extends circumferentially around the entire perimetrical ring 108. However, in other embodiments, the annular bead 126 extends circumferentially around the perimetrical ring 108, e.g., at angular intervals. In still other embodiments, the perimetrical ring 108 features different types of keys, e.g., raised prominences disposed circumferentially around the perimetrical ring 108 at angular intervals. In any embodiment, the perimetrical ring 108 may have radial and/or circumferential symmetry.

FIG. 2F shows a detail view of FIG. 2D showing a representative surface imperfection 116 in the central work surface 106 when the central work region 104 is in the concave configuration. As shown, the concavity of the central work surface 106 generally biases the nicks and cuts 116 into a closed state having a very narrow interior angle 134 (e.g., less than 5 degrees). It shall be appreciated that surface imperfections on the reverse surface 120 (not shown) would assume a similar closed state when the central work surface 106 is in the convex shape (i.e., when the reverse surface 120 is in a concave shape).

FIG. 3A-FIG. 3D show various aspects of the work mat 100 in the stable convex configuration, e.g., after snap-through buckling from the concave configuration. In the convex configuration, surface imperfections of the central work region 104 such as nicks and cuts 116 on the central work surface 106 may be readily cleaned. In the convex configuration, the central work surface 106 has a convex shape, whereas the reverse surface 120 has a concave shape.

Figure 3A:
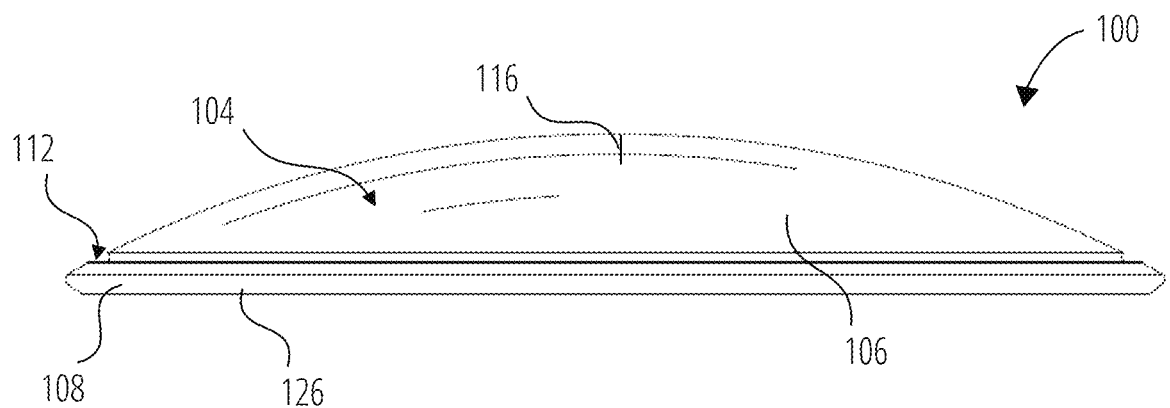
FIG. 3A illustrates a side elevation view of the work mat of FIG. 2A in a convex configuration.
Figure 3B:
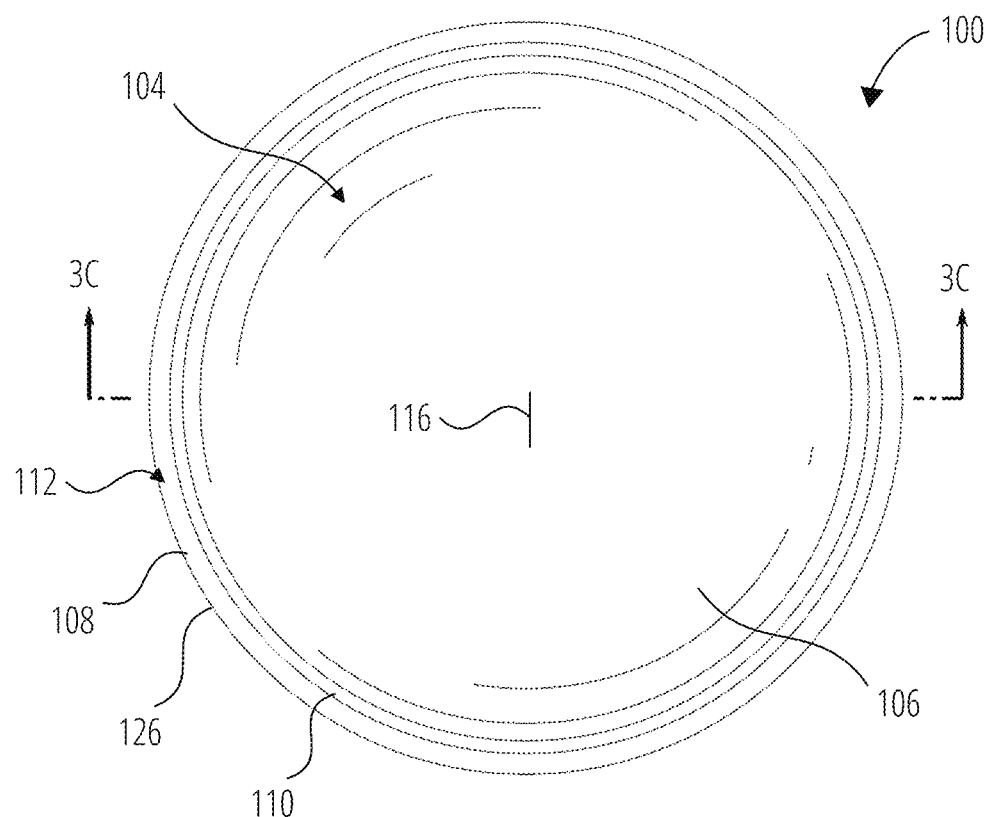
FIG. 3B illustrates a top plan view thereof.
Figure 3C:
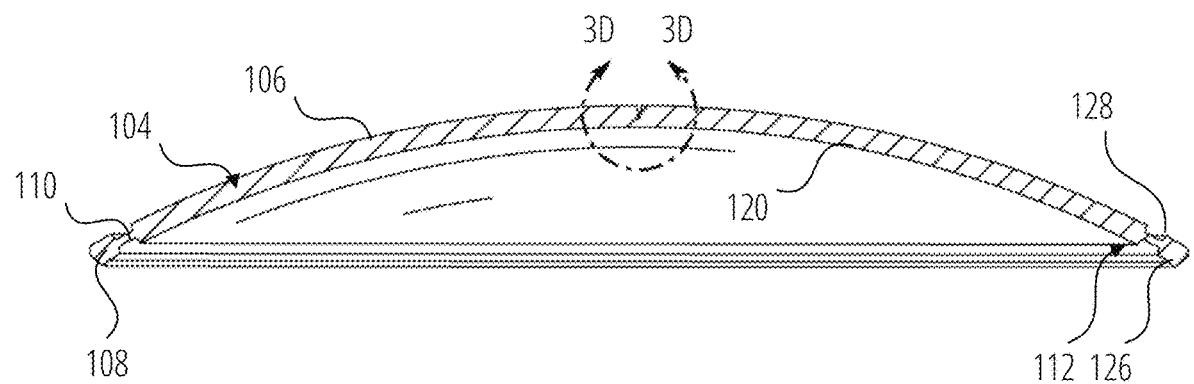
FIG. 3C illustrates a side section view thereof.
Figure 3D:
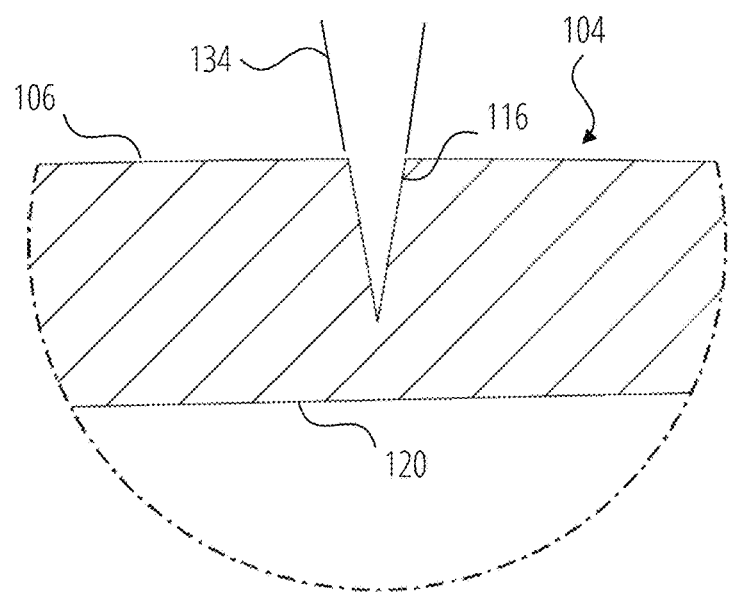
FIG. 3D illustrates a detail view of aspects of the work mat of FIG. 3A.

FIG. 3B-FIG. 3C respectively show a top plan view and side section view of the work mat 100 in order to illustrate details thereof in relation to the snap-through buckling mechanism 112, central work surface 106, perimetrical ring 108, annular bead 126, and web 110, which are further described in the detail views of FIG. 3D.

FIG. 3D shows a detail view of FIG. 3C showing the same representative surface imperfection 116 as shown in FIG. 2F, but in the convex configuration. As shown, the convexity of the central work surface 106 generally biases the nicks and cuts 116 into an open state having a wider interior angle 134 (e.g., greater than 5 degrees) as compared to the concave configuration. Advantageously, the nicks and cuts 116 can be readily and thoroughly cleaned, e.g., with a cleaning fluid as shown in FIG. 1. It shall be appreciated that surface imperfections on the reverse surface 120 (not shown) would assume a similar open state when the central work surface 106 is in the concave shape (i.e., when the reverse surface 120 is in a convex shape).

Figure 4:
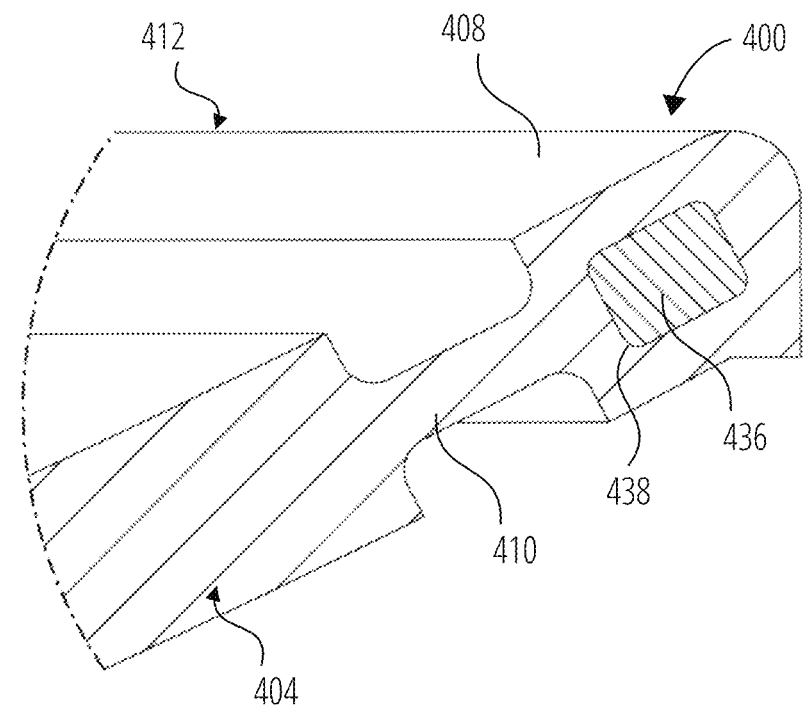
FIG. 4 illustrates aspects of an alternative snap-through buckling mechanism of the present disclosure.
Figure 5:
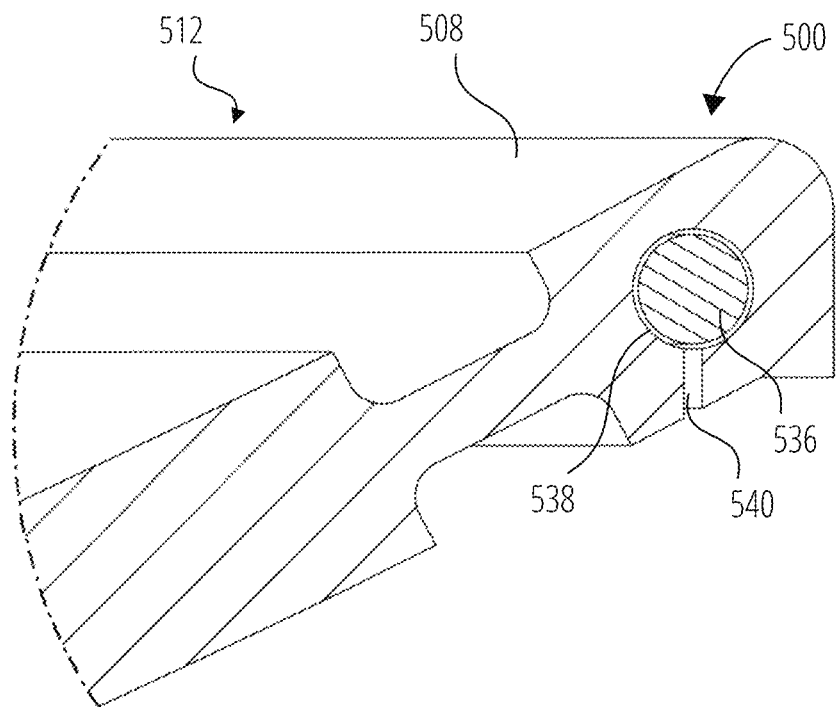
FIG. 5 illustrates aspects of another alternative snap-through buckling mechanism of the present disclosure.

In some embodiments, the perimetrical ring may include an optional stiffening insert, which increases hoop stress of the perimetrical ring and the radially-inward force exerted on the central work region. FIG. 4 and FIG. 5 illustrate representative examples of such embodiments, which are substantially identical to the work mat 100 described with respect to FIG. 1-FIG. 3D except for those details expressly described. For efficiency, the common elements will not be reintroduced or described again except where pertinent to the variations of the embodiments shown.

FIG. 4 shows a work mat 400 in which the perimetrical ring 408 comprises a stiffening insert 436 disposed in a channel 438 thereof. The stiffening insert 436 has an annular shape and is formed of a material having higher tensile stiffness than the remainder of the perimetrical ring 408. Accordingly, the stiffening insert 436 increases radial stiffness of the perimetrical ring 408, thereby increasing the hoop stress exerted upon the central work region 404 via the web 110.

In FIG. 4, the stiffening insert 436 has a substantially rectangular cross section. The cross sectional surface area of the stiffening insert 436 occupies about 20% to about 60% of the cross sectional area of the perimetrical ring 408. In other embodiments, the stiffening insert 436 has a different cross-sectional shape, e.g., circular, ovular, or other shape.

The stiffening insert 436 may be formed of a second flexible, elastomeric material having a higher stiffness than the remainder of the perimetrical ring 408. In such embodiments, the stiffening insert 436 may be co-molded or over-molded with the perimetrical ring 408.

FIG. 5 shows another alternative work mat 500 having a stiffening insert 536 disposed within a channel 538 of the perimetrical ring 508. Unlike the work mat 400 of FIG. 4 however, the stiffening insert 536 has a circular cross section and is not integrally formed with the perimetrical ring 508. Restated, the stiffening insert 536 is a separate component such as a silicone ring having a greater Shore A durometer and which is inserted into the channel 538 via an accessway 540 during assembly of the work mat 500.

Table 3 below provides representative dimensional combinations of work mats 100 (specifically included those molded from 35 Shore A silicone) and which exhibit snap-through buckling and in which the perimetrical ring comprises a stiffening insert as described above with respect to FIG. 4 and FIG. 5. The following dimensions were discovered by the inventors after rigorous experimentation. Any work mat having a stiffening insert may additionally or alternatively embody the dimensional relationships tabulated above in Tables 1 and/or 2.

TABLE 3

Representative Dimensional Combinations (With Insert)

| Embodiment | First Thickness (Central Work Region 102) (mm) | Second Thickness (Perimetrical Ring 106) (mm) | Third Thickness (Web 100) (mm) | First Diameter (Central Work Region 102) (mm) | Second Diameter (Perimetrical Ring 106) (mm) | Depth (Central Work Region 102) (mm) | Insert Size (mm) and Cross-Sectional | Insert Material |
|---|---|---|---|---|---|---|---|---|
| A | 2.75-3.25 | 5.75-6.25 | 0.75-1.25 | 137.5-142.5 | 150.0-155.0 | 15.0-17.0 | 1.50 mm Square | Plastic |
| B | 3.75-4.25 | 5.75-6.25 | 0.25-0.75 | 137.5-142.5 | 150.0-155.0 | 15.0-17.0 | 1.50 mm Square | Plastic |
| C | 3.75-4.25 | 5.75-6.25 | 0.50-1.00 | 137.5-142.5 | 150.0-155.0 | 15.0-17.0 | 1.50 mm Square | Plastic |
| D | 3.75-4.25 | 5.75-6.25 | 0.75-1.25 | 137.5-142.5 | 150.0-155.0 | 15.0-17.0 | 1.50 mm Square | Plastic |
| E | 3.75-4.25 | 5.75-6.25 | 0.75-1.25 | 137.5-142.5 | 150.0-155.0 | 15.0-17.0 | 2.00 mm Square | Plastic |
| F | 3.75-4.25 | 3.75-4.25 | 0.75-1.25 | 137.5-142.5 | 150.0-155.0 | 15.0-17.0 | 1.50 mm Square | Plastic |
| G | 3.75-4.25 | 3.75-4.25 | 0.75-1.25 | 137.5-142.5 | 150.0-155.0 | 15.0-17.0 | 1.50 mm Square | TPU |
| H | 3.75-4.25 | 3.75-4.25 | 0.75-1.25 | 137.5-142.5 | 150.0-155.0 | 15.0-17.0 | Overmold | TPU |
| I | 3.75-4.25 | 3.75-4.25 | 0.75-1.25 | 137.5-142.5 | 150.0-155.0 | 15.0-17.0 | 1.50 mm Round | TPU |
| J | 3.75-4.25 | 3.75-4.25 | 0.75-1.25 | 137.5-142.5 | 150.0-155.0 | 15.0-17.0 | 1.50 mm Round | Silicone-850 |

Advantageously, the bistable snap-through buckling work mats enable repeated and hygienic use in food, beverage, and healthcare applications where cleanliness is paramount. Such advantages are enabled by the snap-through buckling mechanisms described herein, such as the structural features thereof (central work region, perimetrical ring, and web), the dimensions thereof, and/or the materials selection thereof.

Various changes can be made to the embodiments of the present disclosure as could be reasonably contemplated in view of the above-described description by any person skilled in the art. The following claims are presented as examples of embodiments of the present disclosure, but these claims should not be construed to limit other claims or other embodiments disclosed herein.

The detailed description set forth above in connection with the appended drawings, where like numerals reference like elements, are intended as a description of representative embodiments of the present disclosure and are not intended to represent the only embodiments. Each embodiment described m this disclosure is provided as an example or illustration and should not be construed as preferred or advantageous over other embodiments. The illustrative embodiments provided herein are not intended to be exhaustive or to limit the disclosure to the precise forms disclosed. Similarly, any steps described herein may be interchangeable with other steps, or combinations of steps, in order to achieve the same or substantially similar result. Further still, one or more features of any embodiment may be combined with one or more features of one or more embodiments to form additional embodiments, which are within the scope of the present disclosure.

Generally, the embodiments disclosed herein are non-limiting, and the inventors contemplate that other embodiments within the scope of this disclosure may include structures and functionalities from more than one specific embodiment shown in the FIGURES and described in the specification. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed. For example, the present disclosure includes additional embodiments having combinations of any one or more features described above with respect to the representative embodiments.

In the foregoing description, specific details are set forth to provide a thorough understanding of representative embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure.

The present application may include references to directions, such as "first," "second," "vertical," "horizontal," "front," "rear," "left," "right," "top," and "bottom," "below," "around," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" means any number that is more than one, for example, two, three, four, five, etc. The term "about," "approximately," etc., means plus or minus 5% of the stated value. The term "based upon" means "based at least partially upon." The term "between" includes the values recited in connection therewith. The expressions "at least one of A, B, or C"; "at least one of A, B, and C"; and "at least one of A, B, and/or C" have the same meaning, i.e., any one of the following conditions satisfy all of the foregoing expressions: A; B; C; AB; AC; BC; ABC.

Aspects of the inventions described herein may be claimed in any combination, including and combination of the following aspects:

Aspect 1: A bistable snap-through buckling work mat includes a snap-through buckling mechanism having a central work region optionally formed at least partially of a flexible, elastomeric material and defining a central work surface thereon, a perimetrical ring surrounding the central work region that exerts a radially-inward force on the central work region via a web extending between the central work region and the perimetrical ring, wherein the snap-through buckling mechanism is configured to snap buckle between a stable first configuration with a concave central work surface shape and a stable second configuration with a convex central work surface shape.

Aspect 2: The work mat includes a central work region configured to reverse convexity through the perimetrical ring during snap buckling between the first and second stable configurations.

Aspect 3: The work mat is configured such that in the stable first configuration, the central work surface and web extend away from a first side of the perimetrical ring, and in the stable second configuration, the central work surface and web extend away from an opposite second side of the perimetrical ring.

Aspect 4: The work mat includes a perimetrical ring that partially inverts about a radial axis between stable configurations.

Aspect 5: The work mat includes a snap-through buckling mechanism configured to snap buckle between stable configurations upon application of a force urging the central work region to reverse convexity, said force exceeding a threshold.

Aspect 6: The work mat is configured such that in the stable first configuration, the web biases the central work surface toward the concave shape, and in the stable second configuration, the web biases the central work surface toward the convex shape.

Aspect 7: The work mat includes a snap-through buckling mechanism that is unstable in all intermediate configurations between the first and second configurations.

Aspect 8: The work mat includes a central work region having a first thickness, a perimetrical ring having a second thickness, and a web having a third thickness that is less than both the first and second thicknesses.

Aspect 9: The work mat is configured such that the ratio of first thickness to third thickness is 3.5-4.5 and the ratio of second thickness to third thickness is 3.5-4.5.

Aspect 10: The work mat includes a perimetrical ring having a higher stiffness (e.g., in a radial outward direction) than the central work region and web.

Aspect 11: The work mat includes a central work region, web, and perimetrical ring that comprise the flexible, elastomeric material.

Aspect 12: The work mat includes a central work region, web, and perimetrical ring that are integrally molded from the flexible, elastomeric material.

Aspect 13: The work mat includes a perimetrical ring comprising an annular bead of the flexible, elastomeric material connected to the web.

Aspect 14: The work mat includes a perimetrical ring comprising a stiffening insert disposed in a channel thereof.

Aspect 15: The work mat includes a stiffening insert having a higher tensile stiffness than the flexible, elastomeric material.

Aspect 16: The work mat includes a central work region, web, and annular bead that are integrally molded from the flexible, elastomeric material.

Aspect 17: The work mat includes an annular bead that surrounds the stiffening insert.

Aspect 18: A kit comprises a cutting board and any one or more of the above described bistable work mats.

Aspect 19: The cutting board and the bistable work mat interface via complementary keys.

Aspect 20: The complementary keys comprise a channel and an annular bead.

What is claimed is:

1. A bistable snap-through buckling cutting mat, comprising:
a snap-through buckling mechanism, comprising a central cutting region having a uniform first thickness and being formed at least partially of a flexible, elastomeric material and defining a central cutting surface thereon, and a perimetrical ring surrounding the central cutting region, the perimetrical ring exerting a radially-inward force on the central cutting region via a web extending between the central cutting region and the perimetrical ring,
wherein the snap-through buckling mechanism is configured to snap buckle between a stable first configuration in which the central cutting surface has a concave shape and a stable second configuration in which the central cutting surface has a convex shape.

2. The cutting mat of claim 1, wherein the snap-through buckling mechanism is configured so that the central cutting region reverses convexity through the perimetrical ring as the central cutting region snap buckles between the first configuration and the second configuration.

3. The cutting mat of claim 2, wherein the central cutting region has the first thickness, the perimetrical ring has a second thickness, and the web has a third thickness that is less than the first thickness and the second thickness.

4. The cutting mat of claim 3, wherein a ratio of the first thickness to the third thickness is 3.5-4.5 and wherein a ratio of second thickness to the third thickness is 3.5-4.5.

5. The cutting mat of claim 2, wherein the perimetrical ring has a higher tensile stiffness than the central cutting region and the web.

6. The cutting mat of claim 1, wherein in the stable first configuration, the central cutting surface and the web extend away from a first side of the perimetrical ring, and wherein the stable second configuration, the central cutting surface and the web extend away from a second side of the perimetrical ring, opposite the first side.

7. The cutting mat of claim 1, wherein the perimetrical ring partially inverts about a radial axis between the stable first configuration and the stable second configuration.

8. The cutting mat of claim 1, wherein the snap-through buckling mechanism is configured to snap buckle between the stable first configuration and the stable second configuration upon application of a force urging the central cutting region to reverse convexity.

9. The cutting mat of claim 1, wherein in the stable first configuration, the web biases the central cutting surface toward the concave shape, wherein the stable second configuration, the web biases the central cutting surface toward the convex shape.

10. The cutting mat of claim 1, wherein the snap-through buckling mechanism is unstable in all intermediate configurations between the first configuration and the second configuration.

11. The cutting mat of claim 1, wherein the central region, the web, and the perimetrical ring comprise the flexible, elastomeric material.

12. The cutting mat of claim 11, wherein the perimetrical ring comprises an annular bead of the flexible, elastomeric material connected to the web.

13. The cutting mat of claim 12, wherein the perimetrical ring comprises a stiffening insert disposed in a channel thereof.

14. The cutting mat of claim 13, wherein the stiffening insert has a higher tensile stiffness than the flexible, elastomeric material.

15. The cutting mat of claim 13, wherein the central cutting region, the web, and the annular bead are integrally molded from the flexible, elastomeric material.

16. The cutting mat of claim 1, wherein the central cutting surface is smooth and continuous.

17. The cutting mat of claim 1, wherein the central cutting region defines a reverse cutting surface disposed on an opposite side of the central cutting region from the central cutting surface.

18. A cutting mat kit, comprising:
- a cutting board; and
- a bistable cutting mat comprising a snap-through buckling mechanism having a central cutting region formed at least partially of a flexible, elastomeric material and defining a central cutting surface thereon, and a perimetrical ring surrounding the central cutting region, the perimetrical ring exerting a radially-inward force on the central cutting region via a web extending between the central cutting region and the perimetrical ring,
- wherein the snap-through buckling mechanism is configured to snap buckle between a stable first configuration in which the central cutting surface has a concave shape and a stable second configuration in which the central cutting surface has a convex shape,
- wherein the central cutting region has a uniform first thickness.

19. The cutting mat kit of claim 18, wherein the cutting board and the bistable cutting mat interface via complementary keys.

20. A bistable snap-through buckling cutting mat, comprising:
- a snap-through buckling mechanism, comprising a central cutting region formed at least partially of a flexible, elastomeric material and defining a smooth and continuous central cutting surface thereon, and a perimetrical ring surrounding the central cutting region, the perimetrical ring exerting a radially-inward force on the central cutting region via a web extending between the central cutting region and the perimetrical ring,
- wherein the snap-through buckling mechanism is configured to snap buckle between a stable first configuration in which the central cutting surface has a concave shape and a stable second configuration in which the central cutting surface has a convex shape.

\* \* \* \* \*